(12) United States Patent
Thankappan et al.

(10) Patent No.: US 9,904,791 B1
(45) Date of Patent: Feb. 27, 2018

(54) PROCESSING DEVICE HAVING SECURE CONTAINER FOR ACCESSING ENTERPRISE DATA OVER A NETWORK

(71) Applicant: EMC Corporation, Hopkinton, MA (US)

(72) Inventors: Suresh Thankappan, Shrewsbury, MA (US); Narayanan Krishnakumar, Acton, MA (US); Sadasiva Prathab, Hopkinton, MA (US); Qianjie Zhong, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 104 days.

(21) Appl. No.: 13/632,058

(22) Filed: Sep. 30, 2012

(51) Int. Cl.
H04L 29/06 (2006.01)
G06F 21/62 (2013.01)
G06F 21/31 (2013.01)

(52) U.S. Cl.
CPC .............. *G06F 21/62* (2013.01); *G06F 21/31* (2013.01)

(58) Field of Classification Search
None
See application file for complete search history.

(56) References Cited

U.S. PATENT DOCUMENTS 8,078,713 B1* 12/2011 Kim .................. G06F 21/54 709/223
9,143,530 B2* 9/2015 Qureshi ................ H04L 63/20
2005/0060722 A1* 3/2005 Rochette ................... G06F 8/60 719/319
2007/0275745 A1* 11/2007 Owen ............... H04L 29/12122 455/502
2009/0036111 A1* 2/2009 Danford .............. H04L 41/0893 455/419

(Continued)

OTHER PUBLICATIONS

Barr et al., "The VMware mobile virtualization platform: is that a hypervisor in your pocket?", 2010, SIGOPS Oper. Syst. Rev. 44, 4 (Dec. 2010), 124-135.*

(Continued)

*Primary Examiner* — Jeffery Williams
(74) *Attorney, Agent, or Firm* — Ryan, Mason & Lewis, LLP (57) ABSTRACT

A processing device comprises a processor coupled to a memory and implements a secure container for accessing data over a network. The secure container is configured to interact with backend infrastructure of an enterprise in order to provide secure access to enterprise data at the processing device. The secure container may be configured in accordance with an access model that implements multiple-factor authentication in combination with active directory authentication. The backend infrastructure may comprise, for example, a threat management gateway and an application control engine coupled to the threat management gateway and configured to support the multi-factor authentication, as well as additional components such as an active directory, a data loss prevention engine adapted to process communications between the backend infrastructure and the secure container, and a proxy server providing access to a content adaptation server configured to filter communications received from the processing device.

20 Claims, 8 Drawing Sheets

(56) References Cited

U.S. PATENT DOCUMENTS

| | | | |
|---|---|---|---|
| 2009/0132813 A1* | 5/2009 | Schibuk | G06Q 20/223 713/158 |
| 2009/0178109 A1* | 7/2009 | Nice et al. | 726/1 |
| 2009/0204964 A1* | 8/2009 | Foley | G06F 21/53 718/1 |
| 2009/0254670 A1* | 10/2009 | Kim | H04L 67/02 709/230 |
| 2010/0223287 A1* | 9/2010 | Lim | G06F 21/6227 707/769 |
| 2010/0330953 A1* | 12/2010 | Rogel | G06F 9/45537 455/405 |
| 2010/0333088 A1* | 12/2010 | Rogel | G06F 9/45533 718/1 |
| 2011/0277027 A1* | 11/2011 | Hayton et al. | 726/8 |
| 2011/0314515 A1* | 12/2011 | Hernoud | H04W 12/06 726/2 |
| 2012/0023558 A1* | 1/2012 | Rafiq | 726/6 |
| 2013/0018939 A1* | 1/2013 | Chawla et al. | 709/203 |
| 2013/0104225 A1* | 4/2013 | Spicer et al. | 726/12 |
| 2013/0212653 A1* | 8/2013 | Hoghaug | 726/5 |
| 2013/0214898 A1* | 8/2013 | Pineau et al. | 340/5.6 |
| 2013/0214901 A1* | 8/2013 | Pineau et al. | 340/5.61 |
| 2013/0214902 A1* | 8/2013 | Pineau et al. | 340/5.61 |
| 2013/0238808 A1* | 9/2013 | Hallem et al. | 709/227 |
| 2013/0239192 A1* | 9/2013 | Linga et al. | 726/7 |

OTHER PUBLICATIONS

Shaw, Jackson, "Enterprise Single Sign-On. The Holy Grail of Computing", Quest Software, 2009, p. 1-19.*
Kaneshige, Tom, "7 Steps to Stronger Enterprise iPhone Security", Aug. 3, 2010, http://www.reuters.com, accessed Aug. 20, 2017, p. 1-9.*

* cited by examiner

PROCESSING DEVICE HAVING SECURE CONTAINER FOR ACCESSING ENTERPRISE DATA OVER A NETWORK

FIELD

The field relates generally to information processing systems, and more particularly to techniques for providing secure access to enterprise data over a network.

BACKGROUND

Numerous techniques are known for controlling user access to protected enterprise data from a mobile phone, computer or other type of processing device that is outside of an enterprise firewall. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Although two-factor authentication based on token passcodes can provide adequate security in many applications, a need remains for further improvements. For example, even in strongly-defended systems, security breaches are becoming more common due to the increasing sophistication of advanced persistent threats (APTs). APTs are usually mounted by well-funded attackers with very specific targets.

In response to such APTs and other security concerns, many different types of products have been developed to provide enhanced security protections in information processing systems. For example, conventional products can detect the occurrence of security-related events such as firewalls being accessed, customer data being sent outside of a company, malware files being downloaded, or security policy violations. A given such product is typically implemented in software and configured to alert a security operator or other user upon detection of particular events.

Nonetheless, a need remains for improved techniques for providing secure access to enterprise data, particularly from remote locations using mobile telephones, tablet computers, laptop computers and other types of mobile devices. As such mobile devices are coming into more widespread use, it is becoming increasingly challenging for corporations, organizations and other types of enterprises to protect their confidential data.

SUMMARY

Illustrative embodiments of the present invention provide mobile devices that incorporate a secure container for accessing files and other types of enterprise data over a network. For example, such arrangements can be configured to allow corporate employees to review, share, print and otherwise process corporate files in a secure manner from remote locations using their own mobile phones, tablet computers, laptop computers and other mobile devices.

In one embodiment, a processing device comprises a processor coupled to a memory and implements a secure container for accessing data over a network. The secure container is configured to interact with backend infrastructure of an enterprise in order to provide secure access to enterprise data at the processing device. The secure container may be configured in accordance with an access model that implements multiple-factor authentication in combination with active directory authentication. The backend infrastructure may comprise, for example, a threat management gateway and an application control engine coupled to the threat management gateway and configured to support the multi-factor authentication, as well as additional components such as an active directory, a data loss prevention engine adapted to process communications between the backend infrastructure and the secure container, and a proxy server providing access to a content adaptation server configured to filter communications received from the processing device.

The illustrative embodiments advantageously overcome one or more of the above-noted drawbacks of conventional practice. For example, a given such embodiment can be configured such that a mobile device at a remote location is provided with an enhanced ability to securely access corporate files and other types of enterprise data for reviewing, sharing, printing or other processing operations.

DETAILED DESCRIPTION

Illustrative embodiments of the present invention will be described herein with reference to exemplary information processing systems and associated mobile phones, computers and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as network-based communication systems such as cellular and other wireless communication systems.

Figure 1:
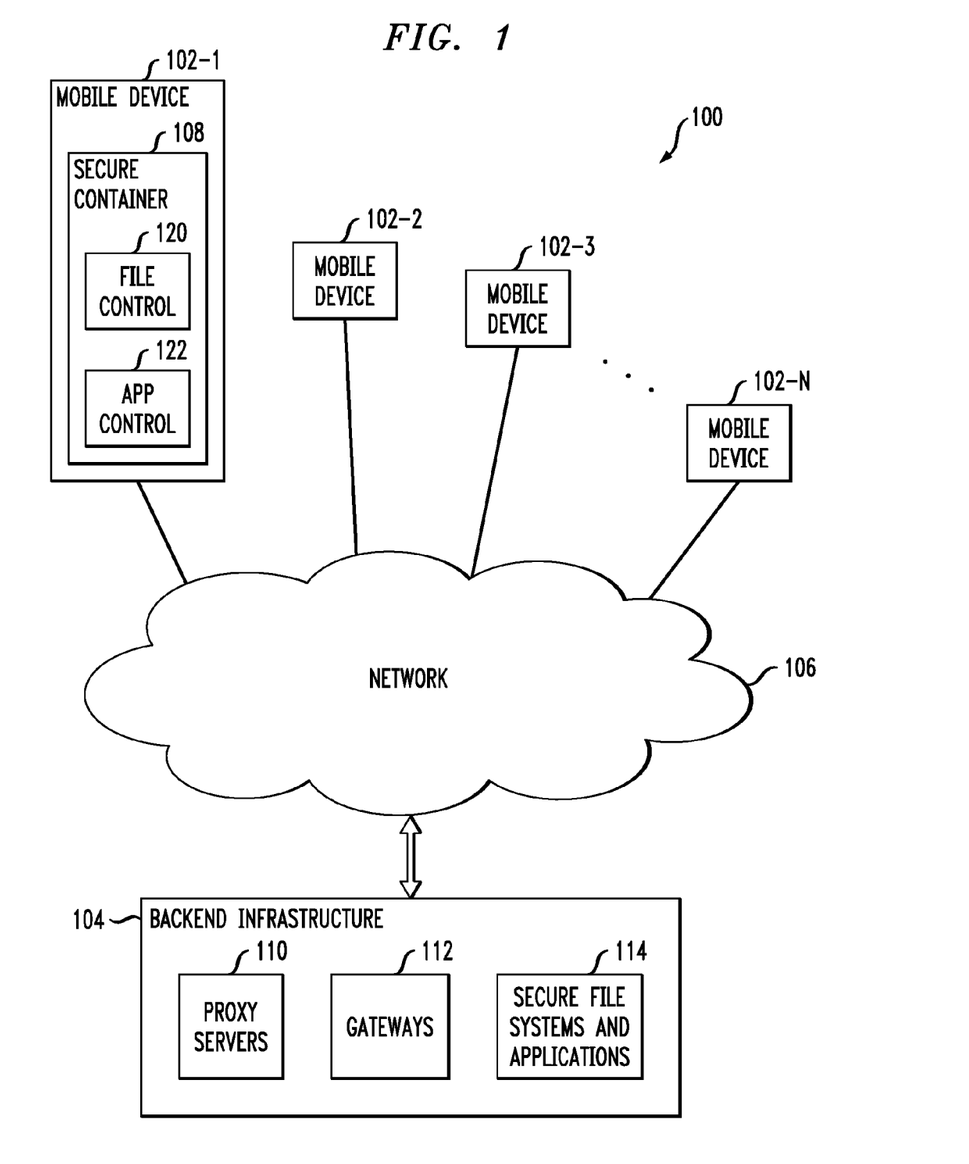
FIG. 1 shows an information processing system having a mobile device configured with a secure container for accessing data over a network in an illustrative embodiment of the invention.

FIG. 1 shows an information processing system 100 configured in accordance with an illustrative embodiment of the invention. The system 100 in this embodiment comprises a plurality of mobile devices 102-1, 102-2, ... 102-N that are configured to communicate with backend infrastructure 104 over a network 106.

The backend infrastructure 104 may be associated with a particular corporation, organizations or other type of enterprise, and the mobile devices 102 may be associated with respective employees or other users of that enterprise. For example, the mobile devices may comprise mobile telephones, tablet computers, laptop computers or other types of communication devices associated with respective enterprise users that access the backend infrastructure 104 from outside of one or more enterprise firewalls. However, there need not be a one-to-one correspondence between mobile devices and users, and therefore at least one of the mobile devices 102 may be accessible to multiple users.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

As will be described, the system 100 is configured such that one or more of the mobile devices 102 each incorporates a secure container 108 for accessing files and other types of enterprise data over the network 106. The secure container 108 is advantageously configured to allow enterprise users to review, share, print and otherwise process files and other enterprise data in a secure manner from remote locations using their own mobile devices.

In order to support operation of the secure container 108, the backend infrastructure 104 in the present embodiment incorporates proxy servers 110, gateways 112 and secure file systems and applications 114. More detailed examples of illustrative arrangements of these and other backend infrastructure elements are shown in FIGS. 6 through 10.

The secure container 108 as illustrated for mobile device 102-1 in the figure comprises a file control module 120 and an application control module 122. The other mobile devices 102 are assumed to be configured in a similar manner.

A given one of the mobile devices 102 may be viewed as an example of what is more generally referred to herein as a "processing device." A given such processing device generally comprises at least one processor and an associated memory, and implements one or more functional modules for controlling certain features of the system 100.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks such as network 106. The network interface circuitry may comprise one or more conventional transceivers.

The secure container 108 and its associated control modules 120 and 122 may be implemented at least in part in the form of software that is stored and executed by respective memory and processor elements of the mobile device 102-1.

Servers 110, gateways 112 and other components of the backend infrastructure 104 may be similarly implemented at least in part in the form of software that is stored and executed by respective memory and processor elements of one or more processing devices.

System elements such as elements 102, 104 and 106 may therefore be implemented using one or more processing platforms each comprising multiple processing devices. Examples of processing platforms that may form portions of the system 100 will be described in more detail below in conjunction with FIGS. 3 and 4. Such processing platforms may comprise cloud infrastructure of a cloud service provider.

As indicated above, a given one of the mobile devices 102 may be associated with a single user, or multiple users may be associated with a single mobile device. The term "user" as utilized herein is intended to be broadly construed so as to encompass, for example, a human user associated with a given device or set of devices, an automated user such as an application or other hardware or software component associated with a given device, or any other entity that may control that device.

It is to be appreciated that the particular set of elements shown in FIG. 1 for providing secure access to enterprise data over a network is presented by way of example, and in other embodiments additional or alternative elements may be used. Thus, another embodiment may include additional networks and additional sets of backend infrastructure or other types and arrangements of mobile devices.

As mentioned previously, various elements of system 100 such as mobile devices 102 and backend infrastructure 104 or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Figure 2:
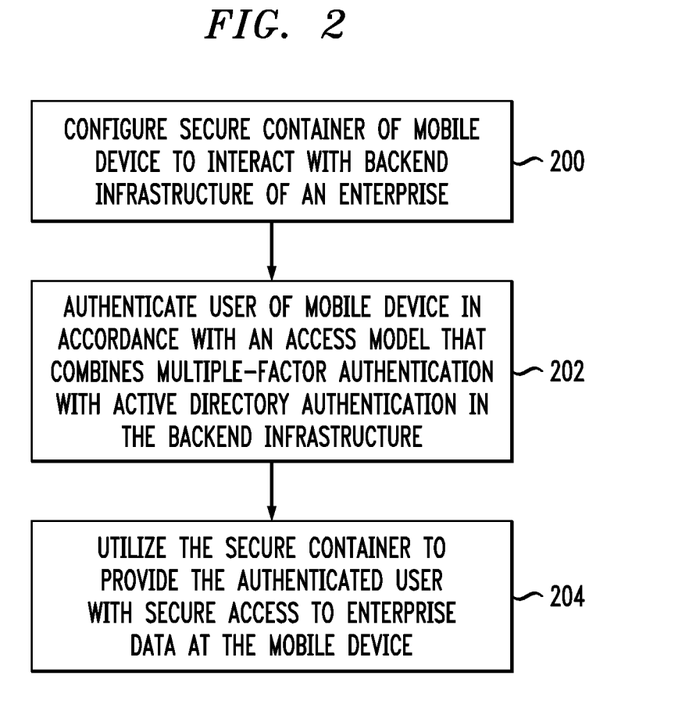
FIG. 2 is a flow diagram of a process for providing a mobile device with secure access to data over a network in the information processing system of FIG. 1.

FIG. 2 shows a set of operations performed by the system 100 in providing secure access to enterprise data via mobile devices 102 over network 106. The process as shown includes steps 200, 202 and 204, and it is assumed that these steps are collectively performed by mobile device 102-1 and backend infrastructure 104 of system 100.

In step 200, the secure container 108 of mobile device 102-1 is configured to interact with the backend infrastructure 104, which as indicated previously is assumed to be associated with a corporation, organization or other enterprise.

For example, the secure container may be configured in accordance with an access model that implements multiple-factor authentication in combination with active directory authentication. Also, the secure container may be configured to communicate with at least one of the proxy servers 110 and gateways 112 of the backend infrastructure, as will be illustrated in more detail in conjunction with the embodiments of FIGS. 6 through 10.

As a more particular example, the secure container 108 may be configured to communicate with a threat management gateway (TMG) of the backend infrastructure 104. The secure container configuration step 200 may also involve configuring the secure container 108 to communicate with other elements of the backend infrastructure 104 that are involved in controlling access to the secure file systems and applications 114, such as a data loss prevention (DLP) engine of the backend infrastructure.

The configuration of the secure container 108 in the above examples may involve interaction between one or more of the elements of the backend infrastructure 104 and the control modules 120 and 122 of the secure container. The controls 120 and 122 in conjunction with such interaction with elements of the backend infrastructure 104 are configured for processing of enterprise data in a secure manner. These secure container controls may be used, for example, to control at least one of reviewing, sharing and printing of portions of the enterprise data. More specifically, the secure container controls may include controls for generating common share requests in order to allow a user of the given mobile device 102-1 to share documents with one or more other users each having a mobile device 102 that implements a corresponding secure container 108. Similar arrangements may be used to generate secure print requests directed to a printer associated with the backend infrastructure 104. More detailed views illustrating processing of respective common share and print requests will be described in conjunction with FIGS. 9 and 10.

In step 202, a user of the mobile device 102-1 is authenticated in accordance with the above-noted access model that combines multiple-factor authentication with active directory authentication in the backend infrastructure 104. A more detailed example of such an access model will be described below in conjunction with FIG. 5.

In step 204, the secure container 108 is utilized to provide the authenticated user with secure access to enterprise data at the mobile device 102-1.

Although not expressly noted above, any communications between the backend infrastructure 104 and the secure container 108 may be encrypted.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing secure access to enterprise data via a secure container of a mobile device.

For example, the ordering of the process steps may be varied in other embodiments, or certain steps may be performed concurrently with one another rather than serially. Also, one or more of the process steps may be repeated periodically or on an as-needed basis responsive to particular events. As mentioned above, the steps of the FIG. 2 process are assumed to be implemented in a processing platform comprising at least one processing device having a processor coupled to a memory.

It is to be appreciated that secure access functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, a given such embodiment can be configured such that a mobile device at a remote location is provided with an enhanced ability to securely access corporate files and other types of enterprise data for reviewing, sharing, printing or other processing operations.

Figure 3:
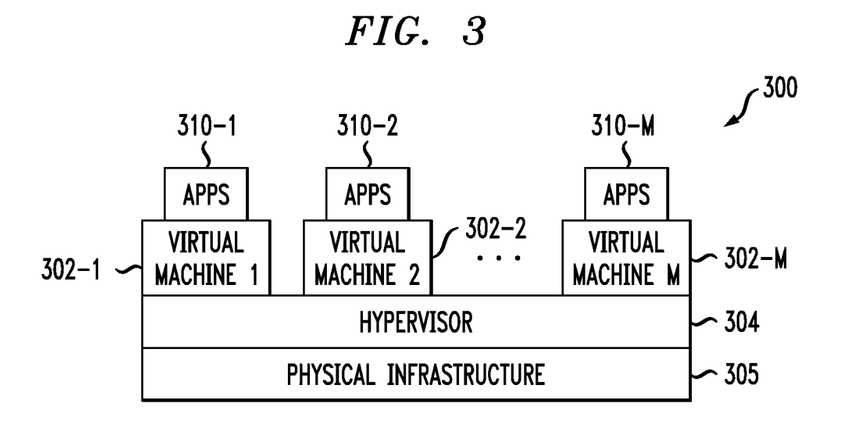
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 300 of information processing system 100 in one or more embodiments of the invention is the VMware® vSphere™ which may have an associated virtual infrastructure management system such as the VMware® vCenter™

The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
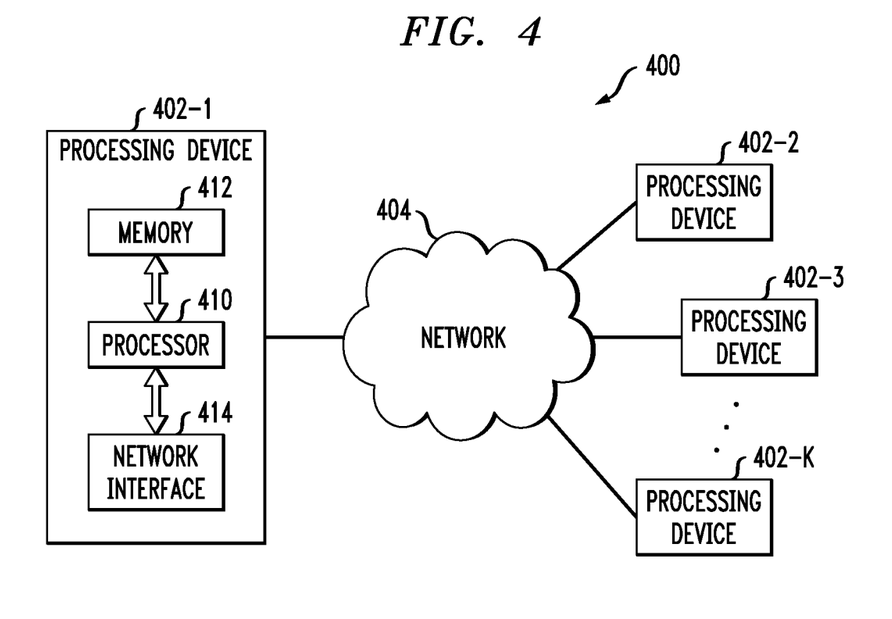

The processing platform 400 in this embodiment comprises a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

Figure 5:
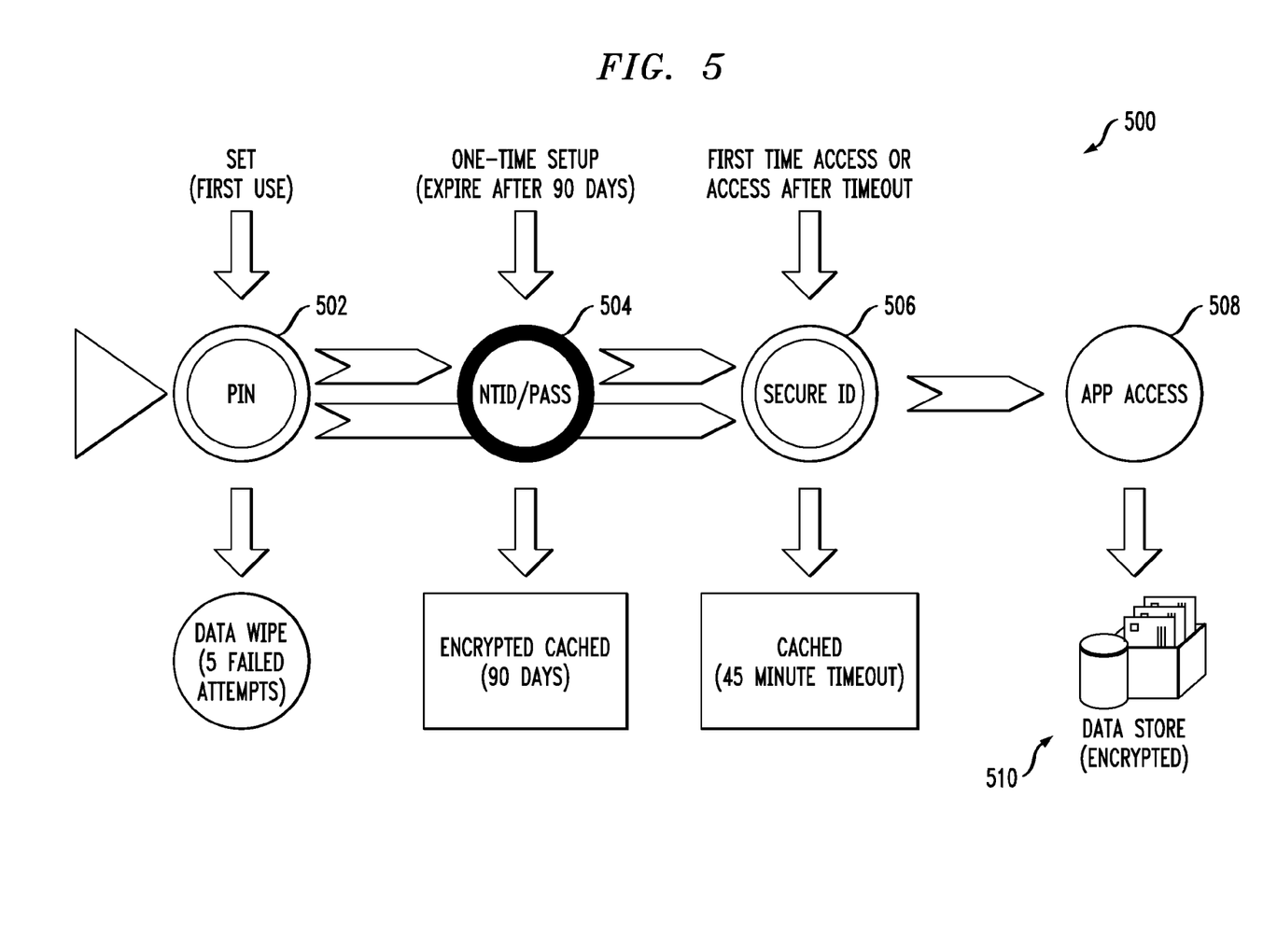
FIG. 5 is a diagram showing a mobile device secure container access model that may be implemented in the FIG. 1 system.

As noted above, a detailed example of the access model referred to in step 202 of the FIG. 2 process is shown in FIG. 5. The access model in this example implements multiple-factor authentication in combination with active directory authentication.

In the figure, access model 500 comprises multiple stages of authentication, involving entry of a PIN in stage 502, entry of a network user identifier (NTID) or password in stage 504, and entry of a SecurID® passcode in stage 506. Each of these stages must be successfully navigated by a user of the secure container 108 in order to reach an application access stage 508 which controls access to an encrypted data store 510 associated with the secure file systems and applications 114 of the backend infrastructure 104.

The various stages 502, 504, 506 and 508 may be viewed as respective separate authentication factors in the overall access model.

In this particular access model example, the PIN stage 502 is set upon first use of the secure container, and a data wipe of the PIN occurs after five failed access attempts. The NTID or password stage 504 has a one-time setup that expires after 90 days. The NTID or password is cached for the 90 day period in encrypted form. The SecurID® stage is required upon a first time access or an access after a timeout period has expired. The passcode is cached for a 45 minute timeout period in this embodiment. Other types of authentication stages and associated parameters, such as number of failed attempts before data wipe, NTID or password expiration interval and timeout period, may be used. The access model 500 is therefore presented by way of illustrative example only.

Numerous different types of enterprise data may be accessed via the secure container 108 of mobile device 102-1. Exemplary system configurations for respective global file share, employee lookup and news feed access models that may be implemented in the system 100 will now be described with reference to FIGS. 6, 7 and 8. These figures may be viewed as showing different possible configurations of system 100 in respective embodiments, or as showing different portions of a single exemplary implementation of the system 100. Generally, in these figures, portions of the backend infrastructure 104 and network 106 are illustrated. A number of the mobile devices 102 are also shown.

Figure 6:
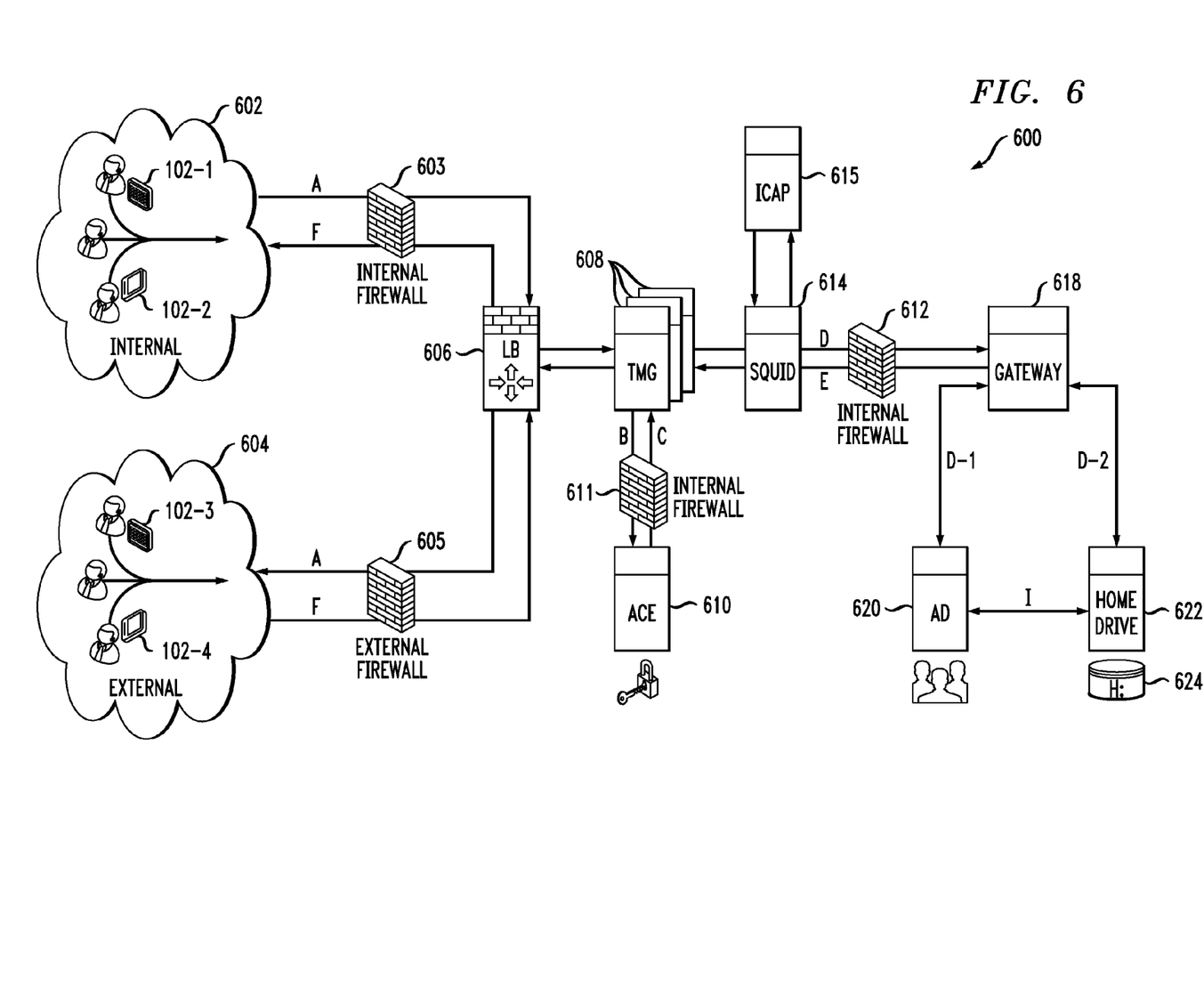
FIGS. 6, 7 and 8 are diagrams showing respective system configurations for global file share, employee lookup and news feed access models that may be utilized to support the secure container implemented in the FIG. 1 system.
Figure 7:
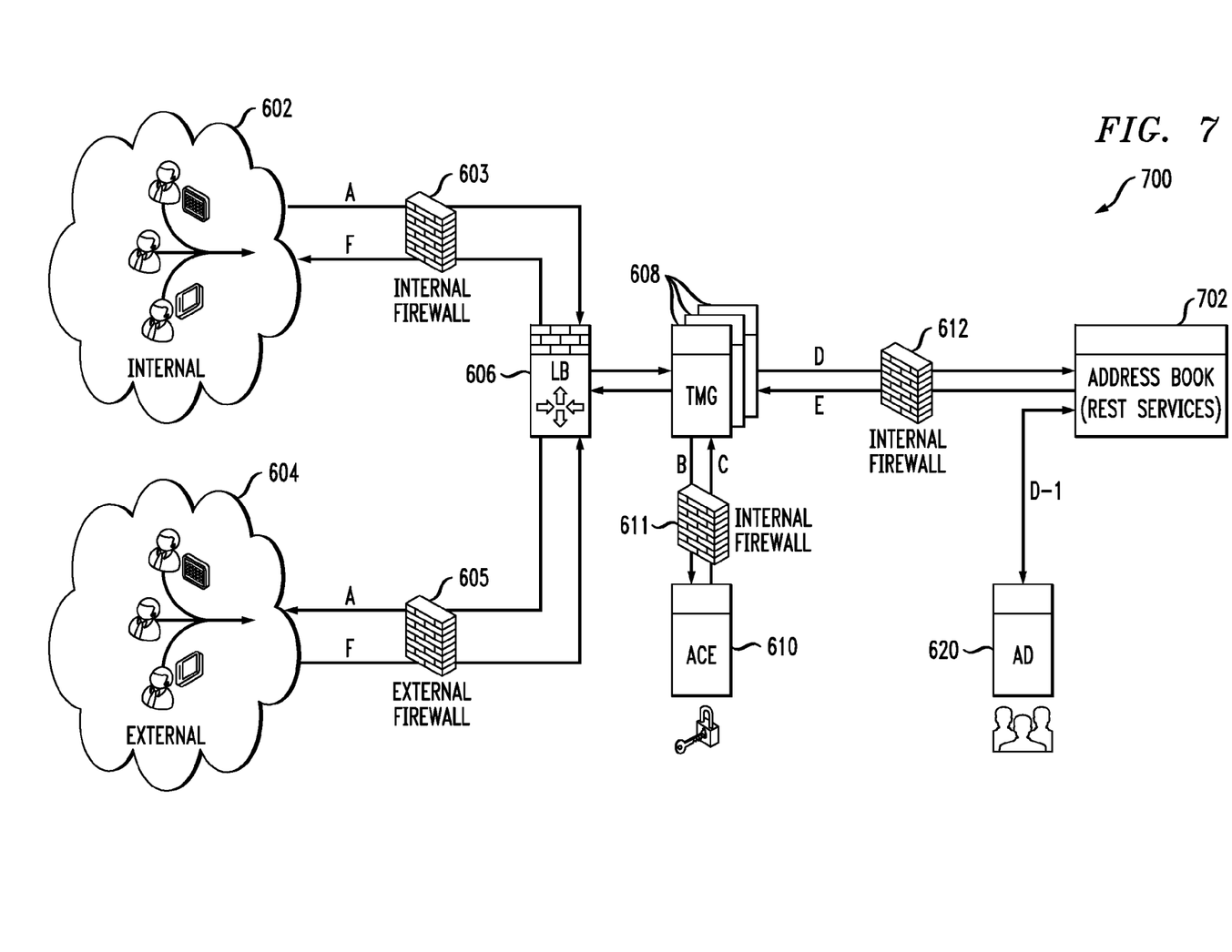
Figure 8:
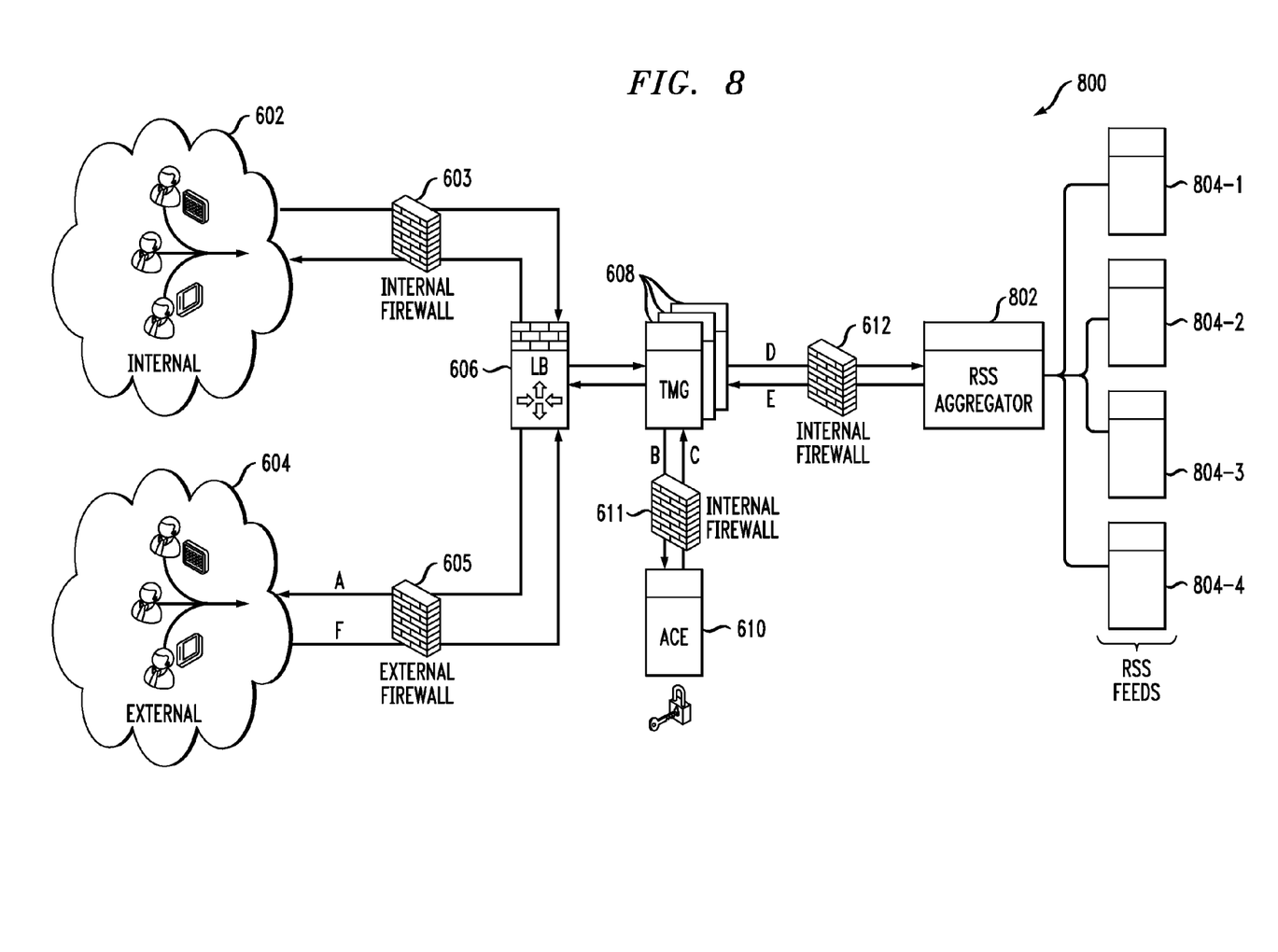

Certain communication paths in FIGS. 6, 7 and 8 are labeled with letter designations, as follows:
A denotes an HTTPS request;
B denotes a SecurID® communication;
C denotes an authentication response;
D denotes an authentication delegation;
D-1 denotes a gateway authentication;
D-2 denotes a gateway authorization;
E denotes an HTTPS response or payload;
F denotes an HTTPS response or payload; and
I denotes a home drive profile.

In the above, HTTPS denotes HyperText Transfer Protocol Secure. It is to be appreciated that these exemplary communications may be replaced with other types of communications in other embodiments.

Referring initially to FIG. 6, the system configuration 600 in this embodiment comprises an internal network 602 associated with an internal firewall 603, an external network 604 associated with an external firewall 605, a load balancer (LB) 606, and a set of TMGs 608. An application control engine (ACE) 610 is coupled to the TMGs 608 via an internal firewall 611 and is configured to support user authentication. The internal network 603 and external network 604 may represent distinct portions of the network 106 of FIG. 1. Mobile devices 102-1 and 102-2 are shown as being within internal network 602 and mobile devices 102-3 and 102-4 are shows as being within external network 604. Of course, the mobile devices 102 can move from network to network in the system.

The system configuration 600 further includes an additional internal firewall 612, and a proxy server 614 illustratively implemented as a Squid proxy server and web cache daemon. The proxy server 614 controls access to an Internet Content Adaptation Protocol (ICAP) server 615. The ICAP server 615 is an example of what is more generally referred to herein as a "content adaptation server," and may be used to filter communications received from the mobile devices 102.

An additional gateway 618 is located behind the internal firewall 612, and interacts with an active directory (AD) 620. As mentioned previously in the context of FIG. 2, user access to enterprise data via the secure container 108 is controlled using multiple-factor authentication supported by an application control engine and active directory authentication, which in the present embodiment is supported by the AD 620.

The gateway 618 controls operates in conjunction with the AD 620 to control access to a home drive 622 for supporting a global file sharing function in the system 100. The home drive 622 has an associated storage volume 624.

FIG. 7 illustrates another system configuration 700 that includes many of the system elements from the configuration 600 of FIG. 6. However, this configuration is arranged to support an employee lookup access model in which the accessed enterprise data comprises employee information in the form of an address book 702. The address book 702 in this embodiment is implemented using Representational State Transfer (REST) services.

FIG. 8 illustrates another system configuration 800 that also includes many of the system elements from the configuration 600 of FIG. 6. However, this configuration is arranged to support a news feed access function. Thus, the accessed enterprise data in this example comprises information gathered by a Rich Site Summary (RSS) aggregator 802 from multiple RSS feeds 804-1, 804-2, 804-3 and 804-4.

Although not expressly shown in FIGS. 6, 7 and 8, these embodiments may incorporate a DLP engine adapted to process communications between the backend infrastructure 104 and the secure container 108. The DLP engine processes these communications in a manner that protects confidential information. For example, the DLP engine may have access to black lists of non-compliant mobile devices. Alerts from the DLP engine may be used to block access to enterprise resources.

Figure 9:
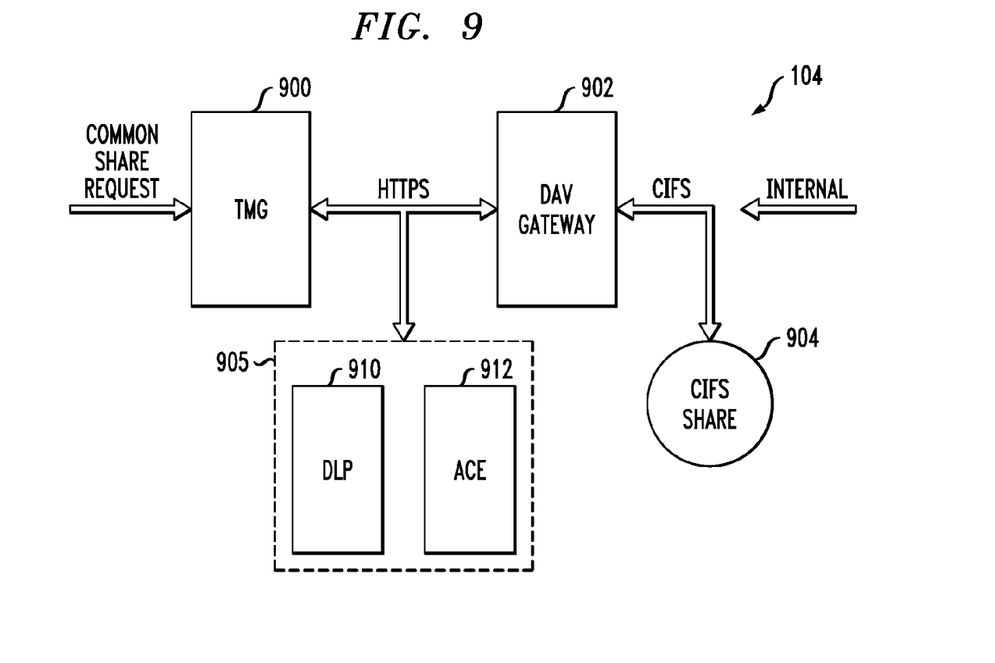
FIG. 9 illustrates a portion of exemplary backend infrastructure of the FIG. 1 system for processing common share requests.
Figure 10:
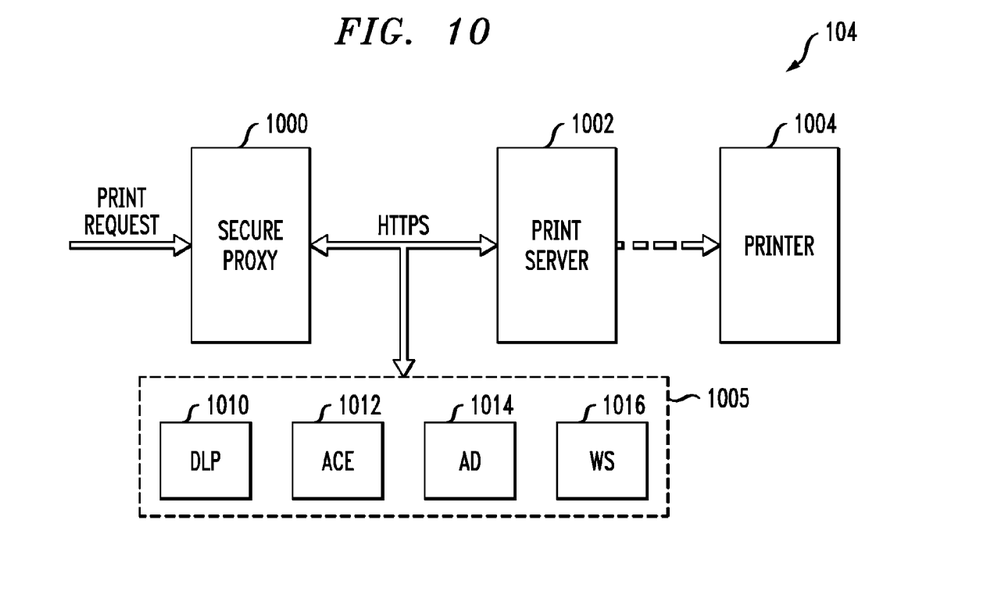
FIG. 10 illustrates a portion of exemplary backend infrastructure of the FIG. 1 system for processing print requests.

Examples of the manner in which a DLP engine may be placed in the backend infrastructure 104 can be seen in FIGS. 9 and 10.

Turning now to FIG. 9, the backend infrastructure 104 in this embodiment is configured to process common share requests received from secure containers 108 of respective mobile devices 102. A given such common share request is received via a TMG 900 and communicated via HTTPS to a Distributed Authoring and Versioning (DAV) gateway 902. The DAV gateway 902 provides access to a file sharing component, illustratively implemented in this embodiment as a Common Internet File System (CIFS) share component 904, allowing sharing of internal enterprise data accessible from other portions of the backend infrastructure 104. The common share requests are also subject to processing in module 905, which illustratively includes a DLP engine 910 and an ACE engine 912.

Documents or other files can only be opened on authenticated mobile devices 102, and cannot be opened outside of their respective secure containers 108. The common share functionality illustrated in FIG. 9 advantageously allows authenticated enterprise users to share documents or other files with one another within their respective secure containers, although as noted above access to such enterprise data in the present embodiment is assumed to require multiple-factor authentication including valid AD credentials. Documents or other files stored within the secure container 108 may only be copied within secure container applications or to elements of the backend infrastructure 104. Similar restrictions apply to emailing of documents or other files.

An implementation of the backend infrastructure 104 configured to process print requests from secure containers 108 of respective mobile devices 102 is shown in FIG. 10. A given such print request is received by a secure proxy 1000 and communicated via HTTPS to a print server 1002 that accesses a printer 1004. The print requests are also subject to processing in module 1005, which illustratively includes a DLP engine 1010, an ACE engine 1012, an AD 1014 and a web services (WS) component 1016.

The secure printing functionality provided by the FIG. 10 embodiment can allow users to print enterprise documents or other files to any enterprise printer without the need to support third-party print tools or vendor proprietary protocols. Any networked printer can be enabled for print request access in the secure container 108 without the need of printer reconfiguration or network access changes.

Documents or other files are only printed from authenticated mobile devices, and cannot be opened outside of the secure container 108. When a given document or other file is opened in the container for viewing, the user is presented with a print dialogue that allows the user to select to print on any one of multiple available printers accessible via the print server 1002. A configuration header sent along with the document or other file may be used to set up appropriate print parameters in the print server 1002.

As indicated previously, functionality such as that described in conjunction with the system and process diagrams of FIGS. 1-10 can be implemented at least in part in the form of one or more software programs stored in memory and executed by a processor of at least one processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platform and processing device configurations, access control processes, access models and secure container arrangements. In addition, any assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
receiving, at a container on a mobile device, a request from a user to access enterprise data stored on backend infrastructure of an enterprise via the container;
authenticating the user in accordance with an access model that implements multi-factor authentication in combination with active directory authentication; and
responsive to authenticating the user in accordance with the access model, providing access to the enterprise data stored on the backend infrastructure via the container on the mobile device;
wherein providing access to the enterprise data comprises restricting use of the enterprise data to one or more applications running within the container on the mobile device; and
wherein authenticating the user comprises:
providing the request from the mobile device to a gateway processing device in the backend infrastructure, the request comprising multi-factor authentication credentials and active directory authentication credentials for the user;
providing the multi-factor authentication credentials in an authentication request from the gateway process- ing device to an application control engine processing device through a first firewall of the backend infrastructure;

receiving an authentication response at the gateway processing device from the application control engine processing device through the first firewall responsive to successful authentication of the multi-factor authentication credentials;

providing the active directory credentials in an authentication delegation from the gateway processing device to an active directory authentication processing device through a second firewall of the backend infrastructure;

receiving, at the gateway processing device through the second firewall, a response payload comprising the enterprise data responsive to successful authentication of the active directory credentials; and providing, from the gateway processing device to the mobile device, the response payload comprising the enterprise data.

2. The method of claim 1 wherein providing access to the enterprise data comprises:

restricting opening of the enterprise data to the container on the mobile device;

restricting copying and sharing of the enterprise data to the container on the mobile device, one or more other containers on one or more other mobile devices, and within the backend infrastructure; and restricting printing of the enterprise data to one or more printers in the backend infrastructure.

3. The method of claim 1 wherein the access model comprises a plurality of stages, each stage being associated with a corresponding parameter, and wherein the plurality of stages comprise:

a first stage comprising entry of a personal identification number, the first stage being associated with a first parameter specifying a number of failed entry attempts of the personal identification number that causes the container to perform a data wipe;

a second stage comprising entry of at least one of a password and a user identifier, the second stage being associated with a second parameter specifying that said at least one of the password and the user identifier expire after a predetermined time interval; and a third stage comprising entry of a current passcode from an authentication token, the third stage being associated with a third parameter specifying a timeout period for validity of entry of the current passcode.

4. The method of claim 3 wherein the access model requires satisfaction of the third stage on a first access and after the timeout period has expired.

5. The method of claim 3 wherein the plurality of stages further comprises an application access stage controlling access to the enterprise data on the backend infrastructure utilizing active directory authentication.

6. The method of claim 5 wherein the access model requires that the first stage, the second stage and the third stage are each successful prior to reaching the application access stage.

7. The method of claim 1 wherein providing access to the enterprise data comprises providing access to a storage associated with the user located in the backend infrastructure.

8. The method of claim 1, wherein providing access to the enterprise data comprises providing access to employee information in an address book associated with the enterprise, the address book being implemented in the backend infrastructure utilizing Representational State Transfer (REST) services.

9. The method of claim 1, wherein providing access to the enterprise data comprises providing access to one or more news feeds via a Rich Site Summary (RSS) aggregator implemented in the backend infrastructure.

10. A computer program product comprising a non-transitory processor-readable storage medium having encoded therein executable code of one or more software programs, wherein the one or more software programs when executed by said mobile device cause the steps of the method of claim 1 to be performed.

11. An apparatus comprising:

a mobile device comprising a processor coupled to a memory;

the mobile device being configured:

to receive, at a container, a request from a user to access enterprise data stored on backend infrastructure of an enterprise via the container;

to authenticate the user in accordance with an access model that implements multi-factor authentication in combination with active directory authentication; and responsive to authenticating the user in accordance with the access model, to provide access to the enterprise data stored on the backend infrastructure of the enterprise via the container on the mobile device;

wherein providing access to the enterprise data comprises restricting use of the enterprise data to one or more applications running within the container on the mobile device; and wherein authenticating the user comprises:

providing the request from the mobile device to a gateway processing device in the backend infrastructure, the request comprising multi-factor authentication credentials and active directory authentication credentials for the user;

providing the multi-factor authentication credentials in an authentication request from the gateway processing device to an application control engine processing device through a first firewall of the backend infrastructure;

receiving an authentication response at the gateway processing device from the application control engine processing device through the first firewall responsive to successful authentication of the multi-factor authentication credentials;

providing the active directory credentials in an authentication delegation from the gateway processing device to an active directory authentication processing device through a second firewall of the backend infrastructure;

receiving, at the gateway processing device through the second firewall, a response payload comprising the enterprise data responsive to successful authentication of the active directory credentials; and providing, from the gateway processing device to the mobile device, the response payload comprising the enterprise data.

12. The apparatus of claim 11 wherein the mobile device is configured:

to restrict opening of the enterprise data to the container on the mobile device;

to restrict copying and sharing of the enterprise data to the container on the mobile device, one or more other containers on one or more other mobile devices, and within the backend infrastructure; and to restrict printing of the enterprise data to one or more printers in the backend infrastructure.

13. A method comprising:

receiving, at backend infrastructure of an enterprise from a container on a mobile device, a request from a user for access to enterprise data stored in the backend infrastructure;

authenticating the user in accordance with an access model that implements multi-factor authentication in combination with active directory authentication; and responsive to authenticating the user in accordance with the access model, providing access by the container on the mobile device to the enterprise data stored on the backend infrastructure;

wherein providing access to the enterprise data comprises restricting use of the enterprise data to one or more applications running within the container on the mobile device wherein authenticating the user comprises:
receiving the request from the mobile device at a gateway processing device in the backend infrastructure, the request comprising multi-factor authentication credentials and active directory authentication credentials for the user;

providing the multi-factor authentication credentials in an authentication request from the gateway processing device to an application control engine processing device through a first firewall of the backend infrastructure;

receiving an authentication response at the gateway processing device from the application control engine processing device through the first firewall responsive to successful authentication of the multi-factor authentication credentials;

providing the active directory credentials in an authentication delegation from the gateway processing device to an active directory authentication processing device through a second firewall of the backend infrastructure;

receiving, at the gateway processing device through the second firewall, a response payload comprising the enterprise data responsive to successful authentication of the active directory credentials; and providing, from the gateway processing device to the mobile device, the response payload comprising the enterprise data.

14. The method of claim 13 wherein the access model comprises a plurality of stages, each stage being associated with a corresponding parameter, and wherein the plurality of stages comprise:

a first stage comprising entry of a personal identification number, the first stage being associated with a first parameter specifying a number of failed entry attempts of the personal identification number that causes the container to perform a data wipe;

a second stage comprising entry of at least one of a password and a user identifier, the second stage being associated with a second parameter specifying that said at least one of the password and the user identifier expire after a predetermined time interval; and a third stage comprising entry of a current passcode from an authentication token, the third stage being associated with a third parameter specifying a timeout period for validity of entry of the current passcode.

15. The method of claim 13 wherein providing access by the container on the mobile device to the enterprise data comprises:

restricting opening of the enterprise data to the container on the mobile device;

restricting copying and sharing of the enterprise data to the container on the mobile device, one or more other containers on one or more other mobile devices, and within the backend infrastructure; and restricting printing of the enterprise data to one or more printers in the backend infrastructure.

16. The method of claim 13 wherein providing access by the container on the mobile device to the enterprise data comprises at least one of:

providing access to a home drive of the user in the backend infrastructure providing access to employee information in an address book associated with the enterprise, the address book being implemented in the backend infrastructure utilizing Representational State Transfer (REST) services; and providing access to one or more news feeds via a Rich Site Summary (RSS) aggregator implemented in the backend infrastructure.

17. A computer program product comprising a non-transitory processor-readable storage medium having encoded therein executable code of one or more software programs, wherein the one or more software programs when executed by said processing device cause the steps of the method of claim 13 to be performed.

18. An apparatus comprising:

at least one processing device comprising a processor coupled to a memory;

the at least one processing device implementing at least a portion of backend infrastructure of an enterprise, the at least one processing device being configured:

to receive, from a container on a mobile device, a request from a user for access to enterprise data stored in the backend infrastructure;

to authenticate the user in accordance with an access model that implements multi-factor authentication in combination with active directory authentication; and responsive to authenticating the user in accordance with the access model, to provide access to the enterprise data stored on the backend infrastructure via the container on the mobile device;

wherein providing access to the enterprise data comprises restricting use of the enterprise data to one or more applications running within the container on the mobile device; and wherein authenticating the user comprises:
receiving the request from the mobile device at a gateway processing device in the backend infrastructure, the request comprising multi-factor authentication credentials and active directory authentication credentials for the user;

providing the multi-factor authentication credentials in an authentication request from the gateway processing device to an application control engine processing device through a first firewall of the backend infrastructure;

receiving an authentication response at the gateway processing device from the application control engine processing device through the first firewall responsive to successful authentication of the multi-factor authentication credentials;

providing the active directory credentials in an authentication delegation from the gateway processing device to an active directory authentication processing device through a second firewall of the backend infrastructure;

receiving, at the gateway processing device through the second firewall, a response payload comprising the enterprise data responsive to successful authentication of the active directory credentials; and providing, from the gateway processing device to the mobile device, the response payload comprising the enterprise data.

19. The apparatus of claim 18 wherein the backend infrastructure comprises an active directory.

20. The apparatus of claim 18 wherein the at least one processing device is configured:

to restrict opening of the enterprise data to the container on the mobile device;

to restrict copying and sharing of the enterprise data to the container on the mobile device, one or more other containers on one or more other mobile devices, and within the backend infrastructure; and to restrict printing of the enterprise data to one or more printers in the backend infrastructure.

* * * * *